TELEVISION SYSTEMS

Filed Sept. 9, 1952 5 Sheets-Sheet 1

INVENTORS
Ralph C. Kennedy &
Alfred N. Goldsmith
BY Olin J. Mitchell
ATTORNEY

INVENTORS
Ralph C. Kennedy &
Alfred N. Goldsmith
BY Otis [signature] Mitchell
ATTORNEY

TELEVISION SYSTEMS

Filed Sept. 9, 1952 5 Sheets-Sheet 3

INVENTORS
Ralph C. Kennedy &
Alfred N. Goldsmith
BY [signature]
ATTORNEY

INVENTORS
Ralph C. Kennedy &
Alfred N. Goldsmith
BY
ATTORNEY

INVENTORS
Ralph C. Kennedy &
Alfred N. Goldsmith
BY [signature]
ATTORNEY

United States Patent Office 2,989,580

Patented June 20, 1961

2,989,580

TELEVISION SYSTEMS

Alfred N. Goldsmith, New York, and Ralph C. Kennedy, Queens Village, N.Y., assignors to Radio Corporation of America, a corporation of Delaware Filed Sept. 9, 1952, Ser. No. 308,642

1 Claim. (Cl. 178—5.1)

The present invention relates to improvements in television transmission systems particularly of the secrecy type in which it is desired to encode or otherwise garble the television transmission such that it can be successfully reproduced only by specialized television receiving equipment.

In more particularity, although not necessarily exclusively, the present invention relates to an improved subscriber type television system in which improved means are provided for transmitting a coded television image signal representing a distorted and useless television scene which can be processed and caused to display a high quality television image only by television receivers having decoding, reconstituting, or descrambling equipment, coordinated with the mode of coding or scrambling employed at the transmitter.

A successful subscriber type television system should be capable of transmitting a television signal virtually meeting the Federal Communications Commission's standards for television signal transmission yet upon being received by a standard home television receiver should present an image which has little or no entertainment value. However, the system should be such as to allow modification of, or minor addition to, the standard home receiver at a minimum expense to the owner such that the owner may, upon paid subscription to a decoding or descrambling agency, be permitted to view the then unscrambled and recovered television broadcasts with all the clarity and entertainment value normally obtained from standard television broadcasts.

Numerous schemes have been suggested in the prior art for providing such an arrangement. In the main part, the most generally desirable type of system is one in which no reliance is made upon auxiliary communication channels but confines its requirements for communication of coding and decoding information between transmitter and receiver, to the standard television and sound channels now provided in accordance with Federal Communications Commission standards. Moreover, regardless of the method of transmitting decoding information from the transmitter to the receiver most prior art systems have been unable to provide obliteration of image information to the point of uselessness when received by standard television receivers without suffering a residual degradation in picture quality upon attempted reconstruction or decoding of the signal, and have been forced to accept a lower transmission efficiency.

Thus, the criteria for evaluating a system for scrambling or garbling television pictures for subscriber consumption appear to be: (1) ease of transmitting necessary decoding control information; (2) the completeness with which entertainment value of the picture is destroyed by the encoding or scrambling means employed; (3) the degree of picture degradation suffered upon attempted reconstruction or decoding of the picture; (4) the simplicity of the equipment necessary to alter and/or supplement standard television receiving circuits to accomplish decoded reception of subscriber types of broadcasts; and (5) "secrecy" or the degree of security the system has against successful use by non-subscribers.

Prior to the present invention, and in view of the above criteria, perhaps the two most desirable approaches to television picture scrambling for subscriber use have been first, video phase reversal of successive frames and second, coded horizontal frame displacement or "jitter" of the television picture.

The video phase reversal system, although lending itself to virtually complete elimination of picture information as viewed on a non-subscriber receiver presents difficulty in reconstruction due to inherent non-linearity of video amplifiers of home instrument quality, whereas the (present or) prior art horizontal "jitter" method although lending itself to ease in reconstruction does permit a residual entertainment value to the television broadcast on non-subscriber sets.

Moreover, in the horizontal "jitter" type of subscriber system, in order to minimize residual entertainment value in the picture, when received on a non-subscriber set, the magnitude of horizontal motion must be so great as to impose serious technical difficulties in its attempted reconstruction. This is due to the inherent non-uniformity of the deflection fields as produced by standard television deflection yokes, which non-uniformity results in a non-linearity in beam deflection.

The present invention overcomes many of the above mentioned difficulties with the provision of a novel television picture scrambling system which provides controlled and coordinated motion of the television image in a plurality of directions as viewed on a non-subscriber set. This is accomplished by a form of overall Lissajous motion of the transmitted television image. Lissajous motion may be defined as that of a point displaced in two or more directions with any desired frequencies of displacement in each such direction, with any desired phase relationship between the displacements in each direction and with any selected ratio of amplitudes of the said displacements. Lissajous figures are, illustratively, straight lines in any direction, circles, ellipses with major axes in any direction, figures of eight with axes in many directions and numerous and complex reentrant or non-reentrant multicyclic curves. The engraved patterns, generally on the edges of stock certificates, paper money and the like, are examples of complex Lissajous figures. These obviously have a high degree of security.

In the present invention, for purposes of security, the Lissajous motion made up of superimposed horizontal and vertical deflection components may be caused to occur in a random manner. For such purposes, the coded Lissajous motions of the scrambled television image may be comprised of segments of recurrent Lissjaous patterns caused to occur at random intervals and utilized at transmitter and receiver. Moreover, the segments of recurring Lissajous patterns may be made up of horizontal and vertical components having the same or different base frequencies. With such an arrangement, the necessary image motion in any given direction to produce a rather high degree of picture smear and unintelligibility is small so that reconstruction at the receiving location may be quite easily accomplished with a high degree of fidelity.

In further accord with the present invention, and in some of its preferred embodiments, complex beam motions inherently resulting from a continuous Lissajous motion of the television image are obviated by providing means which maintain the position of each line stationary, while being scanned in both the transmitter and receiver locations and in still other embodiments maintains the position of the entire frame stationary during each field of scansion. Thus, the interrupted motion of the television image may be constrained to occur only during video blanking intervals.

It is, therefore, an object of the present invention to provide an improved subscriber system for television broadcasts.

It is further an object of the present invention to provide an improved means and method for scrambling television broadcasts in such a way as to render their normal reception of little entertainment value yet provide specially equipped television receivers with high quality television images.

It is still another object of the present invention to provide an improved method of scrambling and descrambling television broadcasts which requires no communication channels other than the video and associated television sound channel now standard in the television art.

It is yet another object of the present invention to provide a subscriber type television broadcast system in which standard television receivers may be easily and economically adapted for successful reception of scrambled subscriber television transmissions.

A more complete understanding of the present invention, its mode of operation and other advantages thereof, will be gathered from a reading of the following description, especially when taken in connection with the accompanying drawings, in which FIGURE 1 is a block diagram representation of one form of picture scrambling and transmitting arrangement useful in the practice of the present invention.

Figure 1:
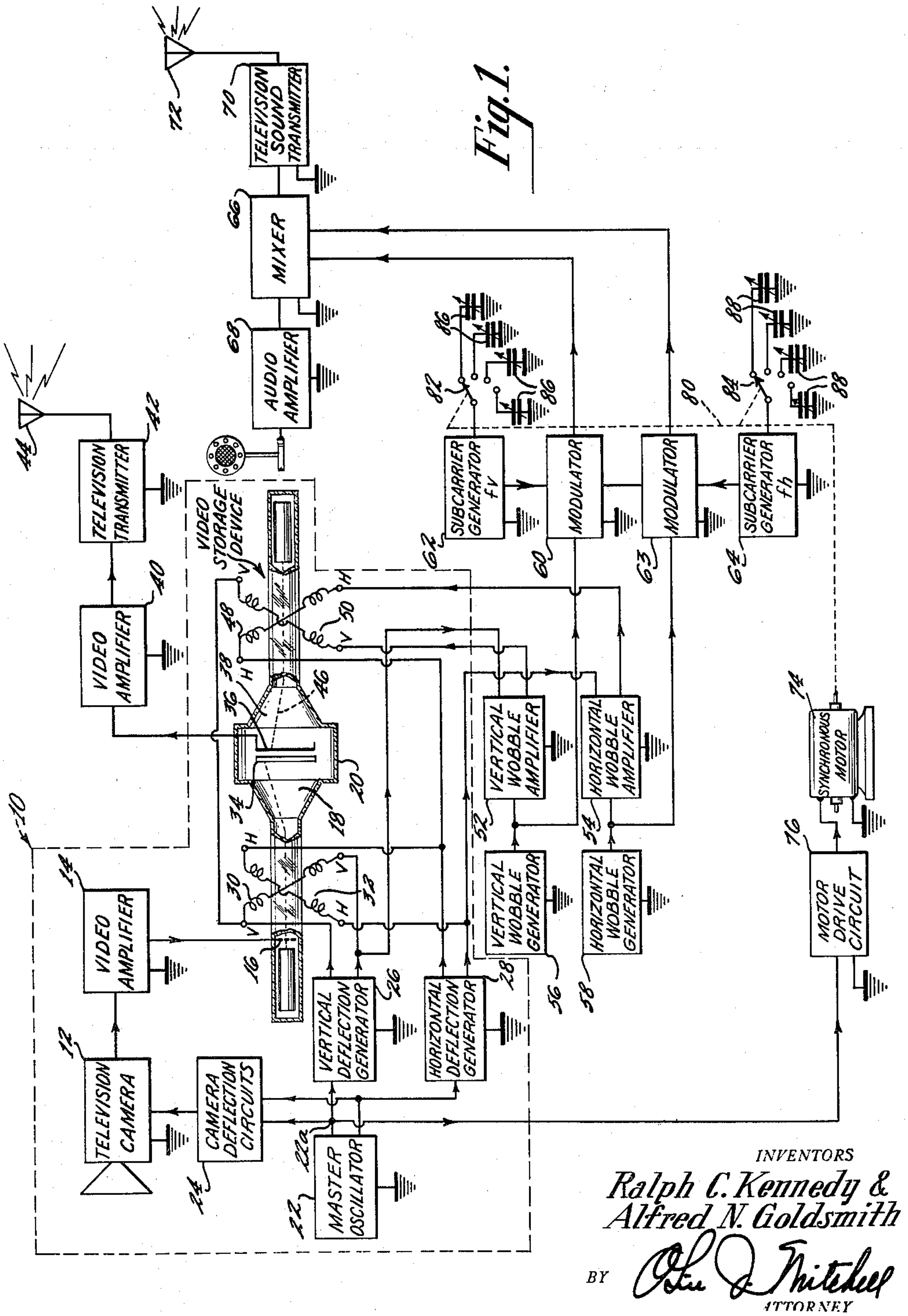

Turning now to FIG. 1, there is illustrated in the dotted line area 10, a television camera system employing a television pickup and video signal processing arrangement. Included is a rectangular scanning means comprising a vertical and horizontal deflection system. Within the dotted line area 10 is shown a conventional television camera 12, adapted to feed a conventional video amplifier 14, whose output is in turn applied to the input 16 of the writing section 18 of a conventional storage tube 20. Deflection for the television camera 12 is timed by the master oscillator 22 whose horizontal and vertical timing signals are applied to camera deflection circuits at 24. Vertical and horizontal timing signals are also applied to the vertical and horizontal deflection generators 26 and 28 employed for the deflection of the storage tube 20. As shown, the output of the vertical deflection generator 26 is applied to the vertical deflection coils 30 of the writing section of the storage tube 20. The output of the horizontal deflection generator 28 is correspondingly applied to the horizontal deflection coils 32 of the writing section of the storage tube 20. By this means the image picked up by the television camera 12 will be faithfully written on the target 34 of the storage tube 20.

The output electrode 36 of the reading section 38 of the storage tube 20 is connected with the input of video amplifier 40 whose output is in turn connected to modulate television video transmitter 42. The output of the transmitter 42 is applied to some form of television broadcast antenna 44. Deflection for the reading beam 46 of the storage tube 20 is supplied by the horizontal and vertical deflection coils at 48 and 50. If the deflection signal through the deflection coils 48 and 50 were linear and identical in waveform to signals supplied to the writing deflection coils 30 and 32, it is manifest that the video signal applied to the video amplifier 40 would be substantially identical to the video signal appearing at the output of television camera 12.

However, in accordance with the present invention, the deflection voltage applied to the reading deflection coils 48 and 50 of the storage tube 20 is a composite signal made up of the combination of the deflection waveform appearing at the output of the vertical and horizontal deflection generators 26 and 28 and the corresponding wobble waveforms appearing at the output of the vertical and horizontal wobble amplifiers at 52 and 54. For this purpose, it can be seen that the horizontal reading deflection coil 48 is connected with the output of the horizontal deflection generator 28 through a series connection with the output of the horizontal wobble amplifier 54. Likewise, the vertical reading deflection coil 50 is supplied with the output of the vertical deflection generator 26 through the series connection of the output of the vertical wobble amplifier 52. The actual waveform of the wobble signal applied to the vertical and horizontal wobble amplifiers is determined by corresponding wobble generator circuits indicated at 56 and 58.

The outputs of the vertical and horizontal wobble generators 56 and 58 may be made to assume any convenient waveform. However, as will be seen hereinafter, certain waveforms lend themselves to more convenient and successful scrambling and descrambling techniques.

To afford means at the receiving end of reconstructing the picture, the vertical and horizontal wobble signals are communicated by some means to the receiving location. This may be done by wire, radio, or other means. One successful method of conveying the decoding information with a rather high degree of security is illustrated in FIG. 1 and comprises the modulation of two supersonic subcarrier signals transmitted over the television sound channel. As shown in FIG. 1, the vertical wobble generator signal in addition to being applied to the vertical wobble amplifier 52 is also applied to a modulator circuit 60 which acts to modulate a subcarrier signal produced by subcarrier generator 62. Correspondingly, the output of the horizontal wobble generator 58 is applied to modulator 63 which amplitude modulates the signal produced by another subcarrier generator 64. Other forms of signal modulation may, of course, be used. For purposes of convenience, the instantaneous frequencies of the subcarrier generators 62 and 64 have been respectively designated as $f_H$ and $f_V$. Outputs of the modulators 60 and 63 are fed to a mixer amplifier 66 which superimposes the modulated subcarriers $f_V$ and $f_H$ upon the audio signal fed to the television sound transmitter 70. Output of the television sound transmitter 70 is applied to a conventional television transmitter antenna 72.

In order to achieve security in the transmission of the scrambled television signals, the frequencies of the subcarriers $f_V$ and $f_H$ may be periodically changed in accordance with a predetermined schedule known only to broadcast station personnel and those television receiver owners subscribing to the television scrambled service.

For example, a synchronous motor 74 driven by a motor drive circuit 76 in turn receiving synchronizing information in the nature of vertical drive pulses from the master oscillator 22, may be caused to change the frequency of the subcarrier generators by means of a mechanical linkage 80. The mechanical linkage illustrated by the dotted line 80 is shown as coupling the synchronous motor 74 with the armatures 82 and 84 of frequency changing switches respectively associated with the subcarrier generators 62 and 64. By way of illustration, these switches have been shown as being of the multi-position type allowing their armatures 82 and 84 to contact variable capacitor sets 86 and 88 whose values determine the frequency of subcarrier generators. It will be seen that by calibrating on an index basis, each member of the sets of capacitors 86 and 88 and permitting their particular settings and sequences of settings for a given broadcast to be known to a receiver owner having a complementary tuned subcarrier detection means, the reconstruction of the vertical and horizontal wobble signals may be realized at a receiver location. On the other hand, any receiver owner not being able to follow the changes in the subcarrier frequencies $f_V$ and $f_H$ will be unable to reproduce the vertical and horizontal wobble waveforms and thereby be without means for reconstructing a television image.

As will be seen hereinafter, the novel means described herein for conveying wobble signal waveforms from transmitter to receiver in no way restricts the application of the improved principle of garbling a television signal by means of vertical and horizontal motion as more fully described hereinafter.

Figure 2:
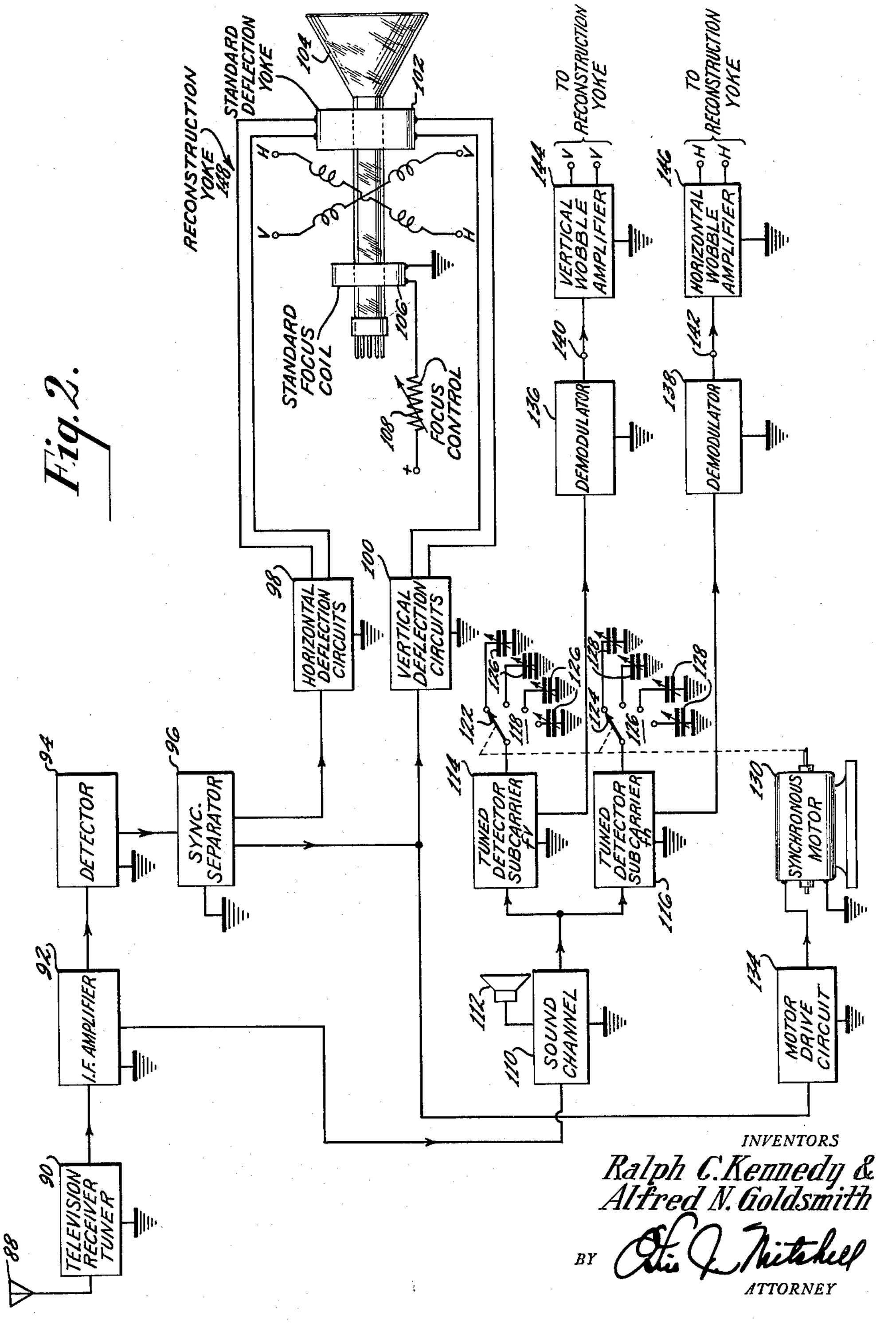
FIGURE 2 is a block diagram representation of one form of receiving and reconstruction arrangement for successfully reproducing the scrambled television broadcasts produced by the arrangement of FIG. 1.

One form of television receiving arrangement suitable for faithfully receiving a subscriber signal and reconstructing the television image is shown in FIG. 2. Here a standard television receiving antenna 88 is connected to provide a standard television receiver tuner 90 with television broadcast signals including the television sound signal.

The output of tuner 90 is applied to a standard superheterodyne intermediate frequency amplifier 92 whose output is detected by the detector 94 and applied to a standard sync separator circuit 96. The horizontal sync signals provided by sync separator 96 are applied for control of the horizontal deflection circuit 98 while the vertical synchronizing signals are applied to vertical deflection circuits 100. Outputs of the horizontal and vertical deflection circuits are conventionally connected to what may be standard television deflection yoke 102. Embracing kinescope 104, in accordance with well known practice and positioned on the neck thereof is a standard focus coil 106 with means 108 for controlling the beam focusing current through the same.

It will be recognized that that portion of the receiving circuit described thus far, with respect to FIG. 2 is completely standard in all respects, and that the circuits in the blocked elements may be of any well known type such as shown in an article entitled "Video Receiver Circuits Simplified" appearing in the magazine "Tele-Tech" for January 1949.

In accordance with the present invention, output from the intermediate frequency amplifier 92 is also applied to a sound channel 110 whose output feeds a sound reproducer such as speaker 112. Sound channel 110, generally of the frequency modulation type, is designed to not only detect and reproduce sound frequencies, but also the supersonic frequencies $f_V$ and $f_H$ appearing on the sound channel as described in connection with FIG. 1. These wobble subcarriers are applied to any suitable form of tuned detector circuits 114 and 116 whose responsive frequency may be varied by some convenient means. By way of example, the tuned detector circuits 114 and 116 are shown connected with the multi-position switches 118 and 120 having selector arms 122 and 124. These selector arms operate on two separate banks of capacitors 126 and 128 whose counterpart may be found in the capacitor banks 86 and 88 in FIG. 1. The selector arms 122 and 124 are driven by a synchronous motor 130, controlled by a drive circuit 134, which in turn receives its timing information from the vertical sync output of the sync separator circuit 96. Thus, when the receiver is in operation, the synchronous motor 130 in FIG. 2 will be in exact synchronism with motor 74 in FIG. 1 and the selector arms on the switches 118 and 120 may be made to move in exact synchronism with the arms 82 and 84 in FIG. 1. Small deviations from synchronized motion between transmitter and receiver selector arms may be compensated by providing a phase adjustment, not shown, between the selector arms and motor stator at the receiver. It can be seen, therefore, that by properly phasing the action of the arms 82 and 84 in FIG. 1 with the arms 122 and 124 in FIG. 2, and also adjusting individual values of capacitors in each of the banks 126 and 128 in FIG. 2, the tuned detectors 114 and 116 can be made to follow the shifts in wobble subcarrier frequencies $f_V$ and $f_H$ produced at the transmitter.

In the practice of the present invention, it is sometimes desirable to arrange the action of the frequency changing selector switches in both the transmitter and receiver so that a change in frequency occurs only during a television blanking interval. In other cases, it may be desirable to replace the selector switches and banks of variable capacitors used to change the frequencies of both the wobble subcarrier generators in the transmitter and tuned detectors in the receiver with a single variable capacitor driven by the synchronous motors. In this way, the changes in frequency of the wobble subcarriers may be made continuous.

The outputs of the tuned detectors 114 and 116 are then applied to respective conventional demodulator circuits 136 and 138 at whose output terminals 140 and 142 will appear whatever forms of wobble signal are produced by the vertical and horizontal wobble generators 56 and 58 at the transmitter. The then demodulated vertical and horizontal wobble signals are then applied to some form of amplifier circuit such as indicated by the blocks 144 and 146 designated as vertical and horizontal wobble amplifiers. If desired, the outputs of these amplifiers may be applied to the windings of an image reconstruction yoke 148. The output terminal designations V—V and H—H of the vertical and horizontal wobble amplifiers indicate their corresponding connections to the coils of the reconstruction yoke having terminals V—V and H—H. In practice, it is desirable to place the reconstruction yoke 148 between the deflection yoke and focus coil as described more fully in U.S. co-pending application, Serial No. 308,625, filed September 9, 1952, now abandoned, by Marshall C. Kidd, entitled "Image Reconstruction System." Utilization of the reconstruction yoke, per se, is only by way of convenience, as it follows from the teaching in connection with FIG. 1, that the outputs of the wobble amplifiers 144 and 146 may be placed in series with the horizontal and vertical deflection circuits 98 and 100 of television receiving system in FIG. 2.

It can, therefore, be seen that the signals as transmitted by the arrangement of FIG. 1 will have little or no entertainment value to an individual not provided with some form of specialized receiving equipment such as that shown in FIG. 2. On the other hand, the arrangement of FIG. 2 may be easily arrived at by rather simple modification of existing television receiving systems so that standard home television receiving sets may be modified at very little expense to receive the rather complex and otherwise useless television signal produced by the transmitting system of FIG. 1.

As discussed briefly above, the realization of the basic benefits inherent in the practice of the present invention, is in no way limited by the precise waveform produced by the vertical and horizontal wobble generators 56 and 58 of FIG. 1. In practice, the vertical and horizontal wobble signals may be of the same waveform or different waveforms. They may be of the same frequency or different frequencies and if the same frequency, may be in phase, or out of phase. It, therefore, appears that the structure of the vertical and horizontal generators 56 and 58 may assume various natures and in fact, the two separate generators may in some instances be incorporated into a single signal generator.

Figure 3:
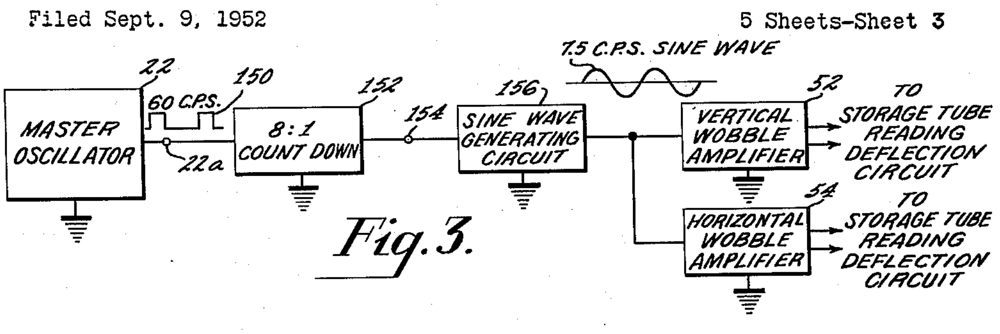
FIGURE 3 is a block diagram representation of a more specific form of the invention broadly illustrated in FIG. 1.

For example, the arrangement of FIG. 3 shows one possible form of vertical and horizontal wobble signal generating arrangement, wherein the basic timing for the vertical and horizontal wobble generators 56 and 58 is derived from the master oscillator 22. For purposes of illustrational convenience, only the vertical driving pulse output terminal 22a of the master oscillator 22 is shown. At this terminal there will be assumed to appear a periodic train of pulses having a recurrence frequency of 60 c.p.s. In the embodiment of FIG. 3, the 60 cycle pulses 150 are applied to some form of countdown circuit 152 having a countdown ratio, by way of example, of 8 to 1. There will then appear at the output terminal of 154 a series of pulses having a recurrence frequency of 7.5 c.p.s. This pulse waveform is then applied to some form of sine wave generating circuit 156, such as, for example, a high Q parallel resonant tuned circuit, whose output is applied to the input of the vertical and horizontal wobble amplifiers 52 and 54. The outputs of the vertical and horizontal amplifiers 52 and 54 in FIG. 3, may, of course, be also connected with a storage tube reading and deflection coils as shown in FIG. 1.

Figure 4:
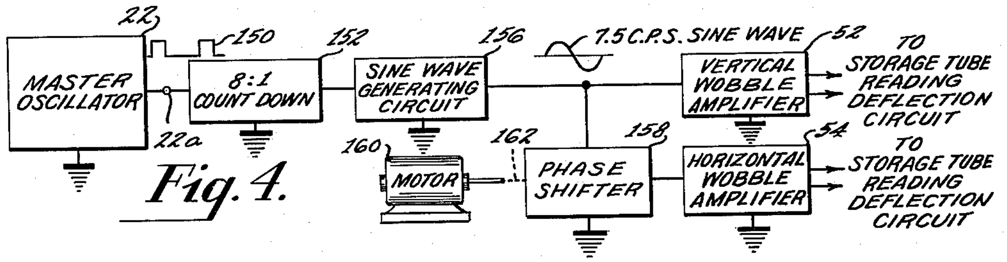
FIGURE 4 is still another specific form of the basic system disclosed in FIG. 1.

Another arrangement useful in producing vertical and horizontal wobble signals is shown in FIG. 4, where again vertical drive pulses 150 are taken from the output of the master oscillator 22. Again these drive signals are counted down by a countdown circuit 152, which is in turn connected to drive a sine wave generator circuit 156 exactly as shown in FIG. 3. The 7.5 c.p.s. sine wave is then, in accordance with the arrangement of FIG. 4, directly applied to the vertical wobble amplifier 52 and applied through a phase shifting means 158 to the input of the horizontal wobble amplifier 54. A motor 160, mechanically coupled via the mechanical linkage 162 to the phase shifter network 158, causes the phase of the horizontal wobble output signal amplifier to vary with respect to the output signal of the vertical wobble amplifier 52. The phase shifter network 158 may be nothing more than a tuned circuit having a variable capacitive or inductive element controlled by the motor 160. The phase shifter 158, on the other hand, may be a lumped delay line circuit having one or more variable elements controlled by the motor 160. The arrangement of FIG. 4 adds a measurable degree of security to the system as practiced in accordance with FIG. 3. Furthermore, the mechanical linkage 162 may be of an intermittent type and the motor 160 of a synchronous nature, whereby the changes in phase between the horizontal and vertical wobble signals may be constrained to occur only during television blanking intervals. Reference to the motor driven synchronous switching arrangement of FIG. 1 and FIG. 2 will make such an adaptation apparent.

Figure 5:
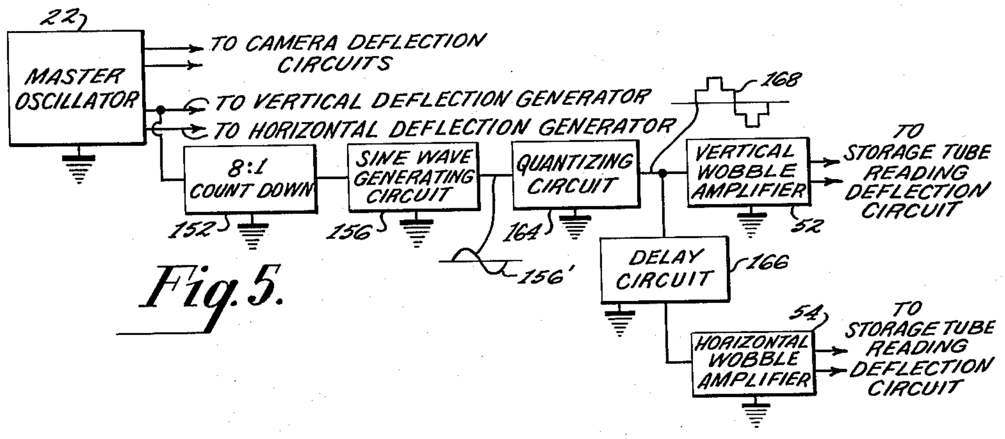
FIGURE 5 is a block diagram representation of still another specific form of the overall system illustrated in FIG. 1.

One preferred arrangement for generating horizontal and vertical wobble signals is shown in the block diagram of FIG. 5. Here the master oscillator 22 again feeds an 8 to 1 countdown circuit 152 whose output is caused to produce a sine wave through the agency of sine wave generator circuit 156. In the arrangement of FIG. 5, the output of sine wave generator 156 is fed into a quantizing circuit 164. The quantizing circuit is adapted to develop a stepped waveform 168, in accordance with the sine wave signal 156'. The output of the quantizing circuit is then fed to the vertical wobble amplifier 52 and to a delay circuit 166. The output of the delay circuit in turn drives the oscillator wobble amplifier 54.

Figure 6:
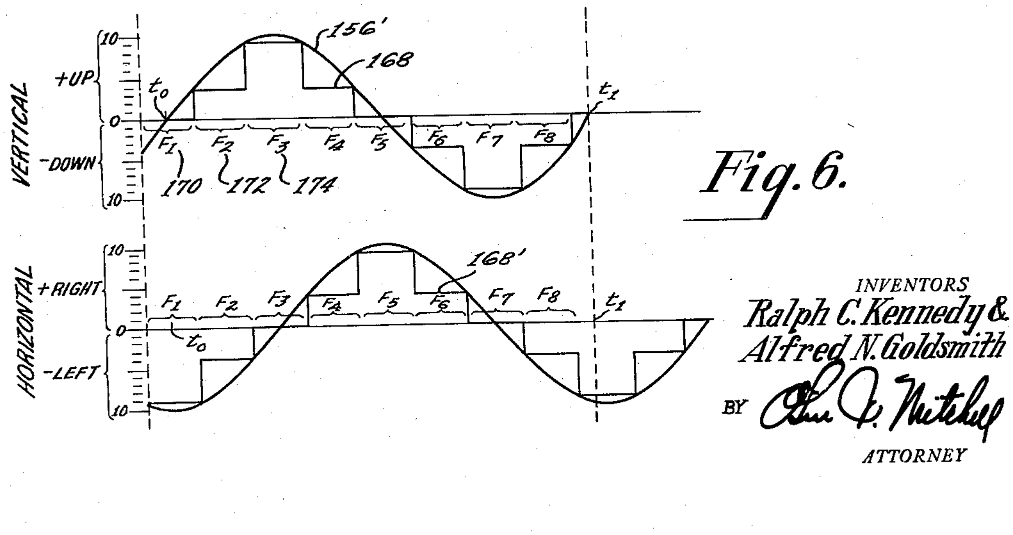
FIGURE 6 is a graphical representation of certain waveforms encountered in that form of the present invention illustrated in FIG. 5.

In understanding the operation of the form of the present invention, shown in FIG. 5, reference should be made to FIG. 6 of the drawings which is a graphic representation of the manner in which the sine wave 156' is quantized to produce the step waveform 168. Since the signal developed by the sine wave generator in 156 bears an 8 to 1 subharmonic relation to the vertical 60 c.p.s. drive pulses produced by the master oscillator 22, it is seen that one complete cycle of the sine wave 156' will embrace eight fields of interlaced television scansion. This is shown in FIG. 6, where the sine wave 156' corresponding to 7.5 c.p.s. is shown compared to the quantized wobble signal 168. By arranging the phase relationship of the sine wave 156' with respect to the field intervals 170, 172, 174, etc. (corresponding to fields F1, F2, F3), and so on, the changes in the amplitude of the quantized signal 168 can be made to coincide with the well known blanking interval occurring between the fields F1, F2, F3, etc. For purposes of illustrational simplicity, the blanking intervals themselves have not been indicated on the drawing. Reference to the November 1950 issue of the I.R.E. Proceedings, page 1253, illustrates in detail the position of the blanking intervals with respect to field intervals in a standard television signal. In accordance with this particular embodiment of the present invention, the horizontal wobble amplifier is provided with a quantized signal 168' which is nothing more than a delayed version of the vertical wobble signal 168. As shown in FIG. 5 the delay circuit delays the quantized signal 168 one-thirtieth of a second which corresponds to 90° of a 7.5 c.p.s. sinusoid. The horizontal quantized wobble 168' will also be such that changes in its amplitude level are constrained to occur during the blanking interval of the television signal, that is, between successive fields. Thus it can be seen that each field and line in the reproduced television image will be stationary during its delineation. This prevents the velocity of electron beam scansion, at either the transmitter or receiver from being modulated by the wobble garbling action of the present invention. This obviates the possibility of undesirable brightness variations in the reproduced television image.

Although an 8 to 1 countdown arrangement has been illustrated in the above quantized wobble signal version of the present invention, it is evident that other countdown ratios may be employed to arrive at a quantized waveform having greater or fewer steps. Furthermore, it is not always necessary to derive the basic control waveform from the master oscillator, as illustrated. In general, it is desirable that any transitions in the quantized waveform be made to occur during a television blanking interval.

If desired, a higher frequency wobble signal may be employed based upon the horizontal deflection frequency of the television system without departing from the spirit and scope of the present invention. In such a case, it may be expedient to quantize the deflection signal as shown in FIG. 6 such that the field intervals shown in FIG. 6 would then correspond to horizontal line intervals. Transition from one level to another in the quantized wobble waveform would then occur during the blanking intervals between the line elements of the above referenced standard television waveform.

Figure 7:
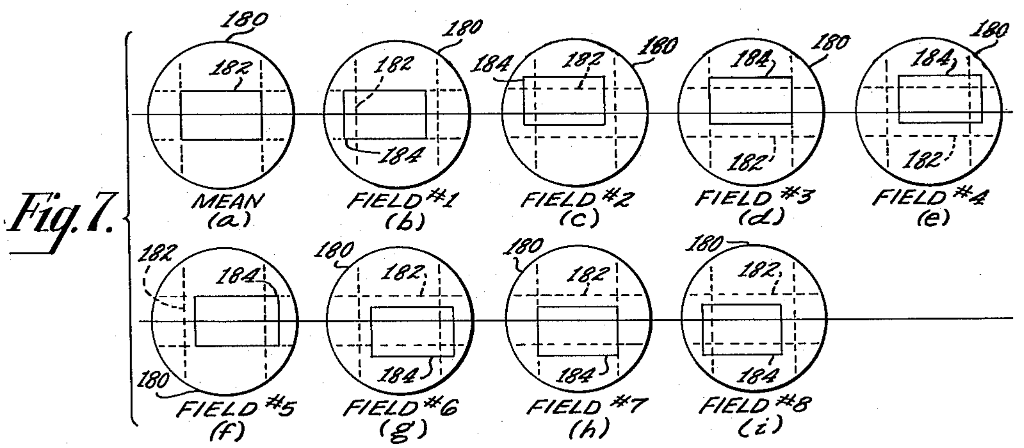
FIGURE 7 is an illustration of one form of television frame motion obtainable in the practice of the present invention.

In order to visualize better the improved garbling action provided through the practice of the present invention, especially the embodiment thereof shown in FIG. 5, a chart presentation of the position of the television raster corresponding to each of the eight fields embraced by FIG. 6, is shown in FIG. 7. The action described in FIG. 7 is that which might be observed if one would attempt to receive a garbled subscriber type television signal, developed by the transmitter of FIG. 1, on a television receiver not equipped in accordance with the present invention, illustrated in FIG. 2.

In FIGS. 7*a* through 7*i* the circles 180 represent the assumed perimeter of a round faced kinescope. A rectangular designation 182, shown in solid line form in FIG. 7*a* and in dotted line forms in FIGS. 7*b* through 7*i*, represents the mean position of the television raster as it would appear on a standard television receiver when reproducing a standard television signal. In FIGS. 7*b* through 7*i*, the actual position of the raster due to the effects of quantized wobble coding at the transmitter as shown in FIG. 1, are shown by the solid line rectangles 184. FIG. 7*b* illustrates the position of the raster or field during the interval of field 1 (F1), shown in FIG. 6. With time $t_0$ as a reference, and ten units being arbitrarily assigned to the peak amplitude of the sinusoid in FIG. 6, it can be seen that the vertical wobble component is zero for this interval, while the horizontal component is minus 9.2 divisions to the left (FIG. 6). During the interval of field 2 (F2), shown in FIG. 7*c*, the raster position will be at 184 as the result of a vertical upward component of approximately 3.8 divisions and a horizontal component to the left of approximately 3.8 divisions (see FIG. 6). FIG. 7*d* corresponds to field 3 in which the raster position is vertically displaced upward 9.2 divisions while not being displaced either to the right or left of the mean 182. Successive field raster positions are shown in FIGS. 7*e* through 7*i*.

It is apparent that the resultant image motion of the unrecovered picture follows a sine wave distribution in time which results in a circular motion or smear. This results from the addition of equifrequent equiamplitude quadrature quantized representations of sine waves, thus constituting one form of Lissajous figure, as above discussed. Visual persistance will cause the image thus to appear to move circularly with a resultant smear and loss of intelligibility. Other methods of quantizing can, of course, be employed without in any way departing from the scope of the present invention.

Figure 8:
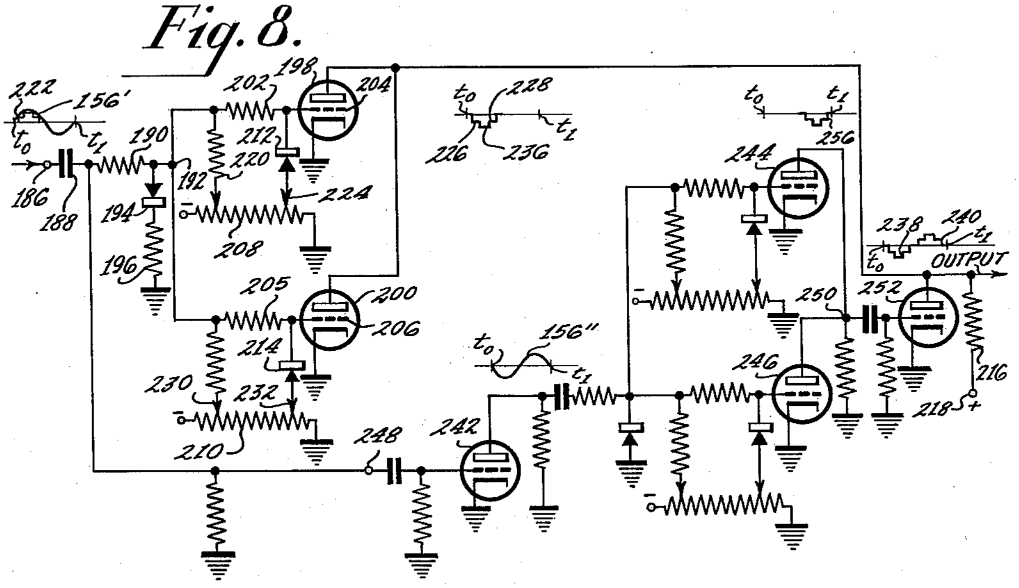
FIGURE 8 illustrates schematically one form of quantizing circuit that may be used in the practice of the present invention.

The arrangement in FIG. 8 shows one form of signal quantizing circuit that may be successfully used in the practice of the present invention. The sine wave 156′ as shown in FIG. 5 is applied to the input of the quantizing circuit at terminal 186. Terminal 186 is in turn coupled via capacitor 188 and resistance 190 to a junction 192. A diode 194 is connected between the junction 192 and the ground through resistance 196. It is the purpose of diode 194 to conduct on negative-going excursions of the sine wave 156 so that only positive-going excursions of this sine wave will be available for application to the gate tubes 198 and 200. Bias for the control electrodes 204 and 206 of these gate tubes are supplied by adjustable bias means which includes tapped resistors 208 and 210, 208 and 210 being connected across negative bias sources. Diodes 212 and 214 are respectively connected from the control electrodes 204 and 206 to suitable points on the tapped resistors 208 and 210. Positive power supply potentials for the anodes of tubes 198 and 200 are supplied through a common load resistor 216 from a positive power supply source having a terminal at 218.

In operation, the tap 220 on resistor 208 is adjusted so that tube 198 is beyond cutoff but such that it will conduct at point 222 on the incoming sine wave 156′. The tap 224 on resistor 208 is then adjusted so that it is positive with respect to tap 220 by a few volts so that as the sine wave 156′ causes the junction 192 to continue to rise in potential above point 222 the diode 212 will conduct and clamp the grid 204 to the potential at tap 224. This will cause an increase in current through resistor 216 and produce the plateau 226 in the stepped waveform 228. Correspondingly, the taps 230 and 232 are adjusted to produce the plateau 236 in the stepped waveform 228. This follows since conduction in tube 200 will further increase the current through resistance 216. Hence the first portion of the stepped output waveform of the quantizing circuit will be formed as shown at 238. The second half or positive-going portion 240 of the quantized output waveform is produced by inverting the sine wave 156′ by means of a phase inverter tube 242. The inverted sine wave is shown at 156″. The inverted sine wave is then applied to gate tubes 244 and 246 whose functions are the same as gate tubes 198 and 200. In fact, it will be seen that the circuit following the terminal 248 in FIG. 8 up to the input terminal 250 of another phase inverter tube 252 is the same as the circuit previously described from terminal 186 to the upper terminal of load resistor 216. Thus, gate tubes 244 and 246 will produce another stepped waveform 256 corresponding to the negative-going portion of the input sine wave 156′ at terminal 186. Signal 256 is then phase inverted through tube 252 and mixed with the signal 228 by means of the common load impedance 216. The result is the composite output waveform comprising sections 238 and 240 and representing a quantized version of the original sine wave 156′.

Other forms of quantizing circuits, of course, may be used without in any way limiting the utility of the present invention.

Figure 9:
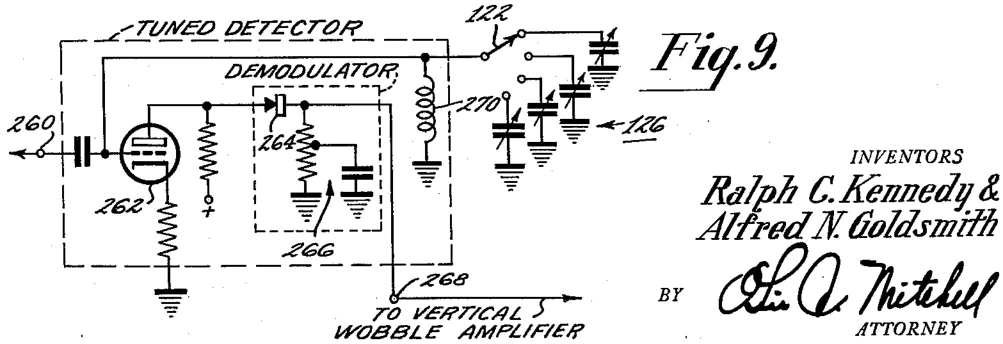
FIGURE 9 is a schematic representation of one form of timed detector and demodulator circuit useful in the practice of the present invention.

By way of example, a tuned detector and demodulator circuit arrangement, useful in the practice of the present invention, has been shown in FIG. 9. The circuitry of FIG. 9 corresponds to the blocks 114 and 136 and 116 and 138 of FIG. 2. The signal from the sound channel 110 in FIG. 2 is applied to the input terminal 260 of FIG. 9. This signal is capacitively coupled to the control electrode of amplifier 262 in whose output circuit is connected a demodulator arrangement. A demodulator arrangement comprises a diode 264 connected in series with a time constant circuit 266. Output signal will then be available at terminal 268. The frequency to which the tuned detector is sensitive is controlled by the inductor 270 taken in combination with the capacitance to ground appearing across the inductor 270. Thus, as the armature 122 (corresponding to FIG. 2) moves across the bank of capacitors 126, also indicated at FIG. 2, the tuned detector arrangement will become responsive to wobble subcarrier frequencies in accordance with the description set forth above.

Although in FIG. 1 and FIG. 2 of the drawings, the novel features of the present invention have been shown and described in connection with means for altering the relative position of video information with respect to the blanking of a horizontal line by means of wobble signals applied in series with the deflection circuits for the image signal generating circuit of the transmitter, the present invention is in no way to be limited to such practice. For example, instead of applying vertical and horizontal wobble signals to the deflection system of the normal arrangement in FIG. 1, it is convenient to eliminate the storage tube 20 entirely and apply the vertical and horizontal wobble signals to phase shifting means connected between the output of the master oscillator and the camera deflection circuit 24. Under such conditions, arrangements are provided for transmitting synchronizing information directly derived from the master oscillator 22 while the camera is synchronized or driven by vertical and horizontal synchronizing pulses having variable phase shift.

Similarly, in the receiver of FIG. 2, the output of the vertical and horizontal wobble amplifiers need not be directly applied to means for shifting the beam of the kinescope 104. In lieu thereof, the outputs of vertical and horizontal amplifiers 144 and 146 of FIG. 2 may be caused to shift the phase of the horizontal and vertical deflection circuits 98 and 100 in a manner complementary to the coding phase deflection of the camera drive circuits in FIG. 1.

Figure 10:
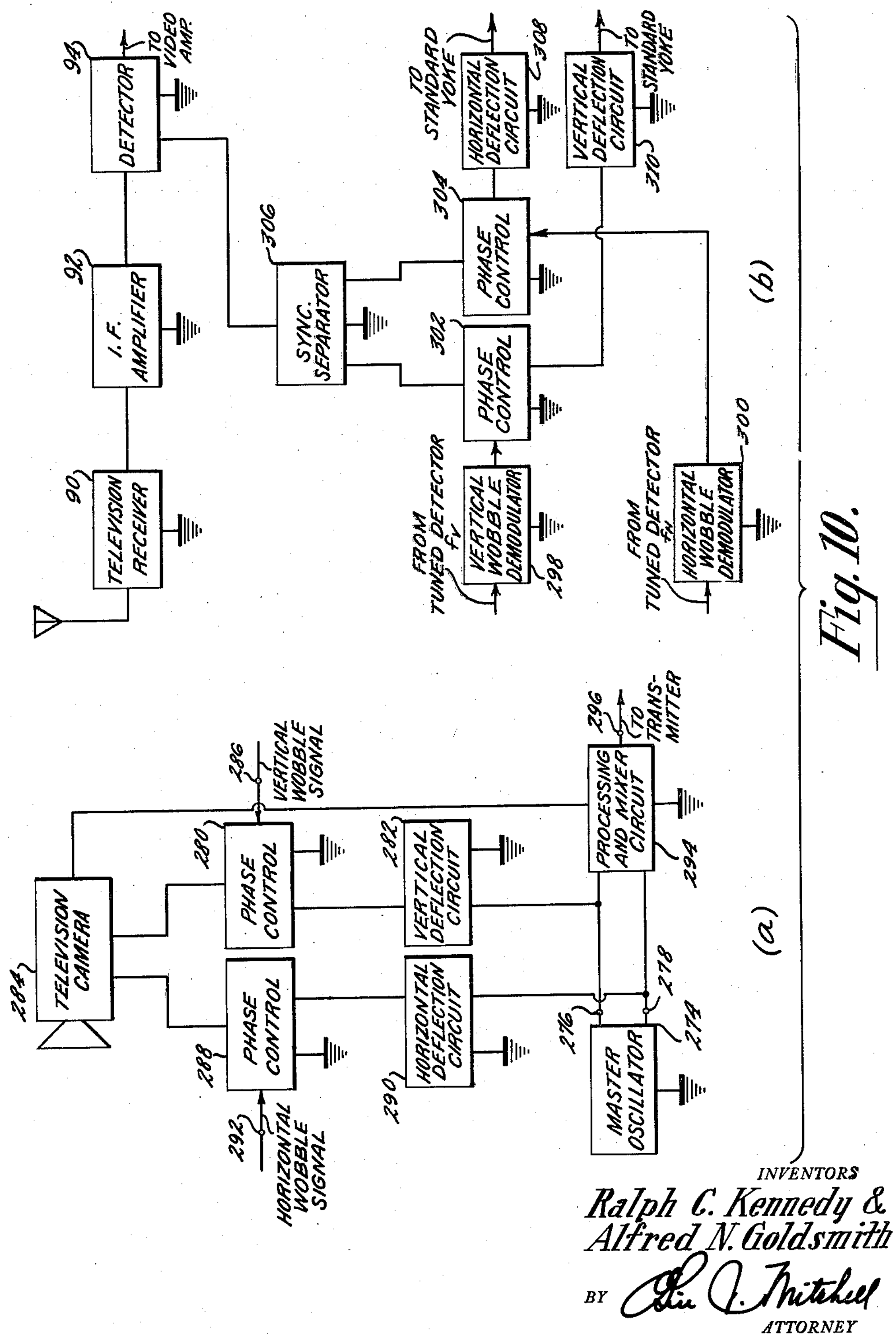
FIGURE 10 is a combination of block diagram representation of another form of the present invention.

One form of such an alternative arrangement is shown in FIG. 10. The transmitting system shown specifically in FIG. 10*a* comprises a standard form of master oscillator 274 having an output at terminal 276 for delivering vertical drive pulses and an output terminal at 278 for delivering horizontal drive pulses. The vertical drive pulses are applied to a vertical deflection circuit 282 whose output signal is coupled to a phase control arrangement 280 whose output drives for the television camera 284. Vertical wobble signals as described hereinbefore are applied to the phase control arrangement 280 at input terminal 286. Similarly, horizontal drive pulses appearing at terminal 278 are applied to the input of a horizontal camera deflection circuit 290 whose output signal is coupled via phase control means 288 to the camera 284. Horizontal wobble signals are applied to the input terminal 292 of the phase control arrangement 288. Thus, the phase of the deflection action applied to television camera 284 will vary in accordance with vertical and horizontal wobble signals thereby to produce irregularities in the position of video information with respect to timing intervals defined by respective vertical and horizontal drive pulses. The vertical and horizontal drive pulses are also applied to the processing and mixing circuit 294 wherein the driving pulses are processed to develop or otherwise produce standard Radio and Television Manufacturers Association sync and blanking signals which are mixed with the video signal output of the television camera 284. Thus, at the output terminal 296 of the processing and mixing circuit 294 a garbled or coded television signal will appear suitable for modulating television transmitter. Vertical and horizontal wobble signals may be developed in accordance with the above teaching in connection with vertical and horizontal wobble generators 56 and 58 in FIG. 1.

For the receiving arrangement as shown in FIG. 10*b* some form of communication channel must be provided between the transmitter and receiving location for communicating the wobble signal. Purely by way of convenience a sound channel subcarrier system has been indicated similar to that described in FIG. 2. Vertical and horizontal wobble demodulators 298 and 300 in FIG. 10*b* correspond directly to demodulators 136 and 138 in FIG. 2. In a matter complementary to the transmitter arrangement shown in FIG. 10*a* the vertical wobble demodulator is connected to modulate a phase control circuit 302 while the horizontal wobble demodulator 300 is adapted to modulate the phase control circuit 304. The phase control circuits 302 and 304 are provided with synchronizing information from the sync separator circuit 306 while their outputs are connected respectively to the horizontal and vertical deflection circuits 308 and 310. The television receiving arrangement comprising the elements 90, 92 and 94 may be exactly as described in connection with FIG. 2. It will be noted that in the arrangement of FIG. 10*b* the output of the horizontal and vertical deflection circuits are applied to a standard deflection yoke, whose action need not be supplemented by a special reconstruction yoke (FIG. 2) since the timing of the deflection action to produce Lissajous motion of the raster will be accomplished by the action of the phase control arrangements 302 and 304.

It should also be noted that in the practice of the present invention it is sometimes convenient in television signal receiving arrangements to apply vertical and horizontal wobble signals in such a way as to supplement the action of the vertical and horizontal beam centering controls if such controls are electrical in operation. This principle is, of course, illustrated in connection with the reading section of the storage tube 20 in FIG. 1. It is common practice in the television art to put D.-C. power sources in series with the horizontal and vertical deflection windings of a deflection yoke. See "Radio Set and Service Review" appearing in the Radio Electronics Magazine, page 34, for November 1950. The D.-C. potentials employed for producing a centering action may be considered as contained within the vertical and horizontal deflection generators 26 and 28 in FIG. 1, so that beam control in the reading section of the storage tube 20 may be considered as that resulting from supplementing vertical and horizontal beam centering potentials with the vertical and horizontal wobble amplifier signals developed between amplifiers 52 and 54. Regardless of the method employed to shift the raster at both transmitter and receiver locations, it is evident that scanning linearity within the raster must be kept substantially fixed regardless of the raster position, if full picture recovery is to be realized. Conventional cathode ray tube structures, of course, provide rather wide limits over which this condition is realized.

From the above, it can be seen that present invention provides a new and useful subscriber type television system having a high degree of security yet requiring only minor modifications of present television equipments in order to practice the same.

What is claimed is:

In a television receiving system, the combination of: a television signal receiving instrumentality adapted to deliver a composite television signal, including a video component, a synchronizing component and a blanking component; a video signal reproducing means having a horizontal and vertical deflection means normally productive of a rectangular picture raster; means connected with said signal receiving means and said signal reproducing means for controlling the action of said horizontal and vertical deflection means; means coupled with said signal receiving means for generating a stepped waveform having a plurality of plateaus, the transition between said plateus being coincident with the blanking component delivered by said signal receiving means; and means coupled with said video signal reproducing means and the output of said stepped waveform producing means for altering the deflection action normally produced by said horizontal and vertical deflection circuits, such that said alterations will occur in quantized degrees corresponding to the plateaus of said stepped waveform.

References Cited in the file of this patent

UNITED STATES PATENTS

| | | |
|---|---|---|
| 2,468,059 | Grieg | Apr. 26, 1949 |
| 2,545,770 | Ellett et al. | Mar. 20, 1951 |
| 2,547,598 | Roschke | Apr. 3, 1951 |
| 2,551,068 | Striker | May 1, 1951 |
| 2,567,539 | Aram | Sept. 11, 1951 |
| 2,570,187 | Aram | Oct. 9, 1951 |
| 2,574,462 | Brown | Nov. 13, 1951 |
| 2,619,530 | Roschke | Nov. 25, 1952 |
| 2,632,799 | Cotsworth et al. | Mar. 24, 1953 |
| 2,636,936 | Goldsmith | Apr. 28, 1953 |
| 2,664,460 | Roschke | Dec. 29, 1953 |
| 2,672,575 | Werenfels | Mar. 16, 1954 |
| 2,678,347 | Clothier | May 11, 1954 |
| 2,705,740 | Druz | Apr. 5, 1955 |